(12) United States Patent
Lauderdale, II et al.

(10) Patent No.: US 8,687,494 B2
(45) Date of Patent: *Apr. 1, 2014

(54) SYSTEM AND METHOD FOR EC/IO ACCESS SCREENING IN A CDMA NETWORK

(75) Inventors: Robert P. Lauderdale, II, Richardson, TX (US); Jian Xiong Lu, Bei Jing (CN); Qihong Liu, Xi An (CN); Bing Zheng, Beijing (CN); Michael Woodmansee, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,795

(22) Filed: Mar. 27, 2012

(65) Prior Publication Data

US 2013/0170365 A1    Jul. 4, 2013

Related U.S. Application Data

(63) Continuation of application No. 11/861,668, filed on Sep. 26, 2007, now Pat. No. 8,159,951.

(30) Foreign Application Priority Data

Sep. 29, 2006   (CN) .......................... 2006 1 0168940

(51) Int. Cl.
| | |
|---|---|
| *H04L 1/00* | (2006.01) |
| *H04L 12/26* | (2006.01) |
| *H04M 1/66* | (2006.01) |
| *H04M 1/68* | (2006.01) |
| *H04M 3/16* | (2006.01) |
| *H04M 3/42* | (2006.01) |
| *H04W 72/00* | (2009.01) |

(52) U.S. Cl.
USPC ........ 370/235; 455/410; 455/414.1; 455/415; 455/452.1; 455/509

(58) Field of Classification Search
USPC ............ 370/235; 455/410, 436, 452.1, 414.1, 455/437, 415, 509
See application file for complete search history.

(56) References Cited

U.S. PATENT DOCUMENTS

| | | | |
|---|---|---|---|
| 5,713,072 | A | 1/1998 | Marth et al. |
| 6,026,301 | A | 2/2000 | Satarasinghe |
| 6,078,817 | A | 6/2000 | Rahman |
| 7,224,972 | B2 | 5/2007 | Pischella |
| 7,623,880 | B2 | 11/2009 | Sinnarajah et al. |
| 2003/0031130 | A1 | 2/2003 | Vanghi |

(Continued)

FOREIGN PATENT DOCUMENTS

EP           1370010         12/2003

*Primary Examiner* — Ronald Abelson
(74) *Attorney, Agent, or Firm* — Meyertons, Hood, Kivlin, Kowert & Goetzel, P.C.

(57) ABSTRACT

Provided are system and method for performing access screening in a CDMA network. In one embodiment, the method comprises comparing a strength of a reference pilot specified in an origination message ("ORM") received from the mobile unit to at least one of an upper pilot strength threshold ("UPST") and a lower pilot strength threshold ("LPST"); responsive to the reference pilot strength failing to exceed the LPST, redirecting the mobile unit; responsive to the reference pilot strength exceeding the LPST but failing to exceed the UPST, determining whether an additional pilot is reported having a strength greater than that of the reference pilot; and responsive to a determination that no additional pilot is reported having a strength greater than that of the reference pilot, redirecting the mobile unit.

20 Claims, 2 Drawing Sheets

(56) References Cited

U.S. PATENT DOCUMENTS

| | | |
|---|---|---|
| 2004/0203655 A1 | 10/2004 | Sinnarajah et al. |
| 2004/0266352 A1 | 12/2004 | Kuurne et al. |
| 2005/0085230 A1 | 4/2005 | Welnick et al. |
| 2005/0202821 A1 | 9/2005 | Pischella |
| 2006/0286970 A1 | 12/2006 | Otobe et al. |
| 2009/0075651 A1 | 3/2009 | MacNaughtan et al. |

SYSTEM AND METHOD FOR EC/IO ACCESS SCREENING IN A CDMA NETWORK

CROSS-REFERENCE

This application claims priority to U.S. patent application Ser. No. 11/861,668, filed on Sep. 26, 2007 and entitled "SYSTEM AND METHOD FOR Ec/Io ACCESS SCREENING IN A CDMA NETWORK," which claims priority to Chinese patent application number 200610168940.7, filed Sep. 29, 2006, the disclosures of each of which are incorporated herein by reference in their entirety.

BACKGROUND

The following disclosure relates generally to communications systems and, more particularly, to Ec/Io access screening in a code division multiple access ("CDMA") network.

Echo is the ratio of received pilot energy (Ec) to total received energy or the total power spectral density (Io) expressed in dB. Ec/Io is a CDMA-only reading and is sometimes referred to as pilot strength. A ratio of −10 dB to −14 dB is normal; ratios higher than −14 dB are progressively worse to −31.5 dB, at which power readings are immeasurable.

It has been noted that, for a live customer market, approximately 25% of all origination access failures occur when the active pilot strength is low and approximately 13% of all origination drops occur under these conditions. Screening based solely on the Echo of the primary or reference pilot result in a higher number of calls being redirected without a significant increase in performance.

SUMMARY

In one embodiment, a method of performing access screening in a CDMA network is provided. The method comprises comparing a strength of a reference pilot specified in an origination message ("ORM") received from the mobile unit to at least one of an upper pilot strength threshold ("UPST") and a lower pilot strength threshold ("LPST"); responsive to the reference pilot strength failing to exceed the LPST, redirecting the mobile unit; responsive to the reference pilot strength exceeding the LPST but failing to exceed the UPST, determining whether an additional pilot is reported having a strength greater than that of the reference pilot; and responsive to a determination that no additional pilot is reported having a strength greater than that of the reference pilot, redirecting the mobile unit.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
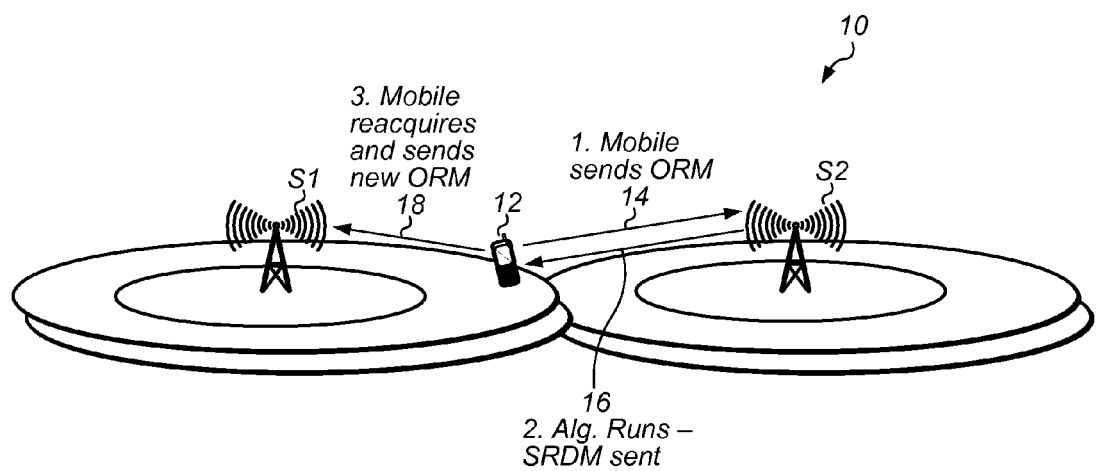
FIG. 1 illustrates a CDMA network in which an Echo access screening method of one embodiment is advantageously implemented.

The present disclosure relates generally to communications systems and, more particularly, to Ec/Io access screening method for use in a code division multiple access ("CDMA") network. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein, the following terms have the following meanings:

Ec—Pilot energy accumulated over one pseudo-noise ("PN") chip period.

Io—Total power spectral density in the received bandwidth.

Ec/Io—The ratio in dB between the pilot energy accumulated over one PN chip period ("Ec") to the total power spectral density in the received bandwidth ("Io").

Channel Assignment into Soft Handoff ("CASHO") (as defined in TIA/EIA/IS-2000)—The ability of the system to accept the report of multiple pilot PNs from a mobile and use that report to assign multiple sectors ("PNs") to the mobile in the Channel Assignment Message.

Pilot PN—The Pilot PN Sequence Offset Index.

Pilot PN Sequence Offset Index—The PN offset in units of 64 PN chips of a pilot, relative to the zero offset pilot PN sequence.

Pilot PN Sequence—A pair of modified maximal length PN sequences with a period $2^{15}$ used to spread the Forward CDMA Channel and the Reverse CDMA channel. Different base stations are identified by different pilot PN sequence offsets.

Pilot Channel—An unmodulated, direct-sequence spread spectrum signal transmitted continuously by each CDMA base station. The pilot Channel allows a mobile to acquire the timing of the Forward CDMA Channel, provides a phase reference for coherent demodulation, and provides a means for signal strength comparisons between base stations for determining when to handoff.

PN Sequence—A periodic binary sequence with "0" mapped to "1" and "1" mapped to "−1".

PN Chip—The time duration of one binary bit in the PN sequence.

AF—Access failure.

Origination Message ("ORM") Received Flag—Software flag that indicates that an origination message has been received.

Reference Pilot/Reference PN—The pilot PN corresponding to the base station where the mobile unit is originating.

Additional PNs—Pilot PNs corresponding to base stations other than the base station where the mobile unit is originating that the mobile unit is able to receive and of which the mobile unit is able to measure the strength.

FIG. 1 illustrates a portion of a CDMA network 10 in which features of embodiments such as those described herein may be advantageously implemented. As shown in FIG. 1, the CDMA network 10 is divided into a plurality of sectors each having a base station, as represented in FIG. 1 by base stations BS1 and BS2, with which a mobile unit 12 may communicate in a conventional manner. In accordance with embodiments described herein, to initiate communications, the mobile unit 12 sends an Origination Message ("ORM") to the base station of its current reference sector. The ORM contains information as to the strength of the primary or reference PN. The ORM may also contain information regarding the strengths of additional PNs corresponding to other base station sectors.

Using the example illustrated in FIG. 1, as indicated by an arrow 14, the mobile unit 12 sends an ORM to the base station BS2. It will be assumed for the sake of example that the mobile unit is not currently using the optimum sector as its reference sector. Accordingly, responsive to receipt of the ORM, the base station BS2 runs the Ec/Io access screening method, which will be described in greater detail below with reference to FIG. 2, and upon determining that the strength of the reference pilot is weak, sends a Service Redirection Message ("SRDM") to the mobile unit 12, as indicated by an arrow 16. In response to receipt of the SRDM, the mobile unit 12 enters a System Determination Substate, in which it reacquires the network 10 (as defined in TIA/EIA/IS-2000), selects a different sector (e.g., base station BS1) as its reference sector, and sends an ORM to its new reference sector. Using the example illustrated in FIG. 1, as indicated by an arrow 18, having selected the base station BS1 as its new reference sector, the mobile unit 12 sends an ORM thereto. The process described above is repeated for the new reference sector.

It will be recognized that a significant number of origination attempts occur on weak pilots, which are defined herein as pilots having an Echo, or pilot strength, below an "Upper Pilot Strength Threshold", or "UPST". Redirecting a mobile unit originating on a weak pilot enables the mobile unit to move to a stronger pilot (e.g., one having an Echo that exceeds the UPST) prior to attempting another origination. Upon receipt of an SRDM, the mobile unit enters a System Determination Substate, in which the mobile unit reacquires the system and selects a new pilot, at which point the mobile unit resends the ORM. If the mobile unit reports additional pilots that are stronger than the reference pilot, a redirection may not be necessary unless the reference is very weak; that is, the Echo thereof is below a "Lower Pilot Strength Threshold", or "LPST". Checking the ORM Received Flag prior to mobile unit redirection ensures that the current origination is not a duplicate of a previously sent origination.

Figure 2:
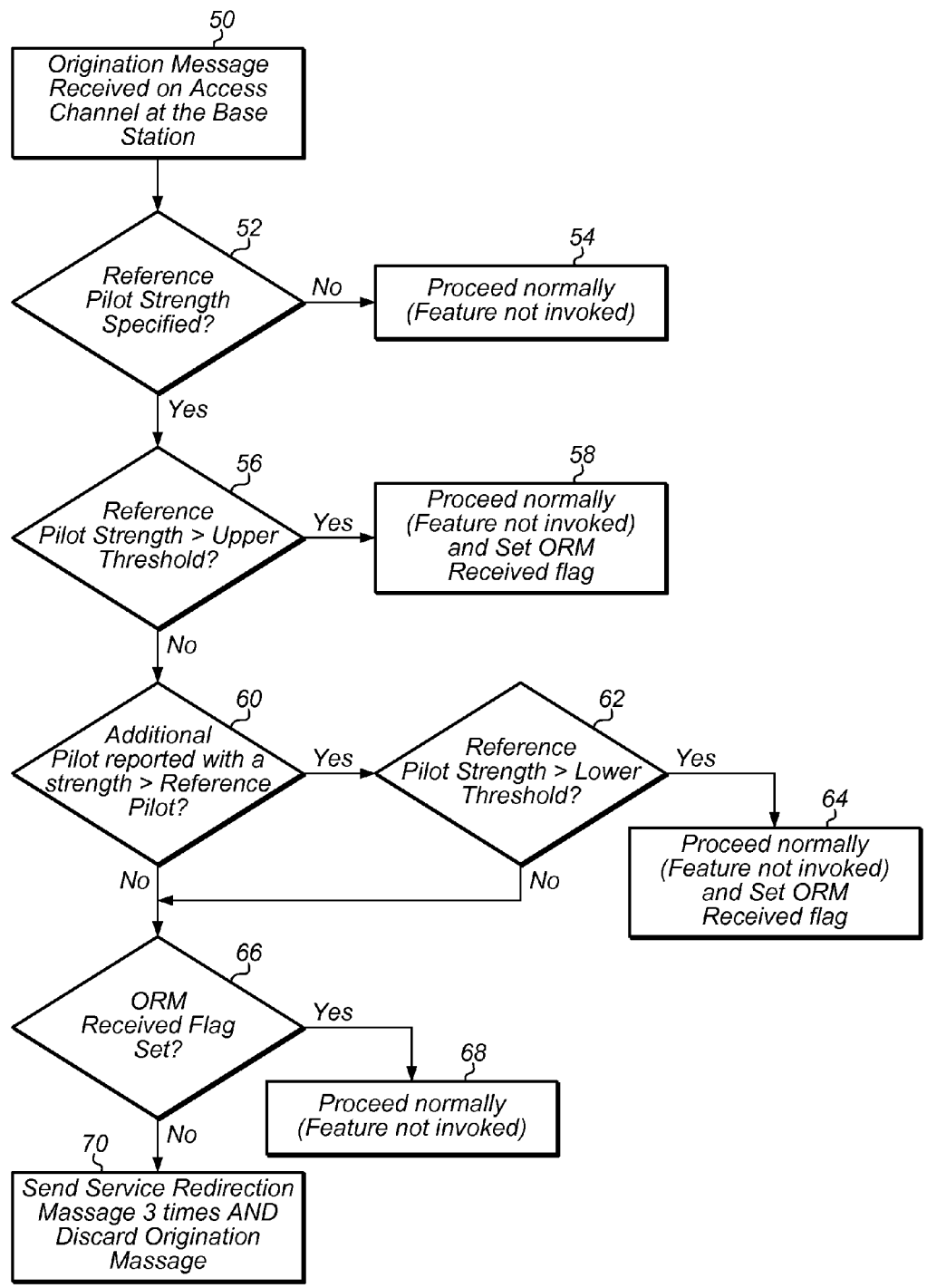
FIG. 2 is a flowchart of an Echo access screening method of one embodiment.

FIG. 2 is a flowchart of a Echo access screening method in accordance with one embodiment. As noted above with reference to FIG. 1, the Echo access screening method may be implemented at each of the base stations of a CDMA network. In one embodiment, each base station may include a computer and a computer program product stored on a computer-readable medium and comprising computer-executable instructions for implementing the Echo access screening method at the base station.

Referring to FIG. 2, in step 50, an ORM is received from a mobile unit on an access channel. In step 52, a determination is made whether a reference pilot strength is specified. If not, in step 54, no redirection is called for by the Echo access screening method described herein and execution proceeds normally; otherwise, execution proceeds to step 56. In step 56, a determination is made whether the specified reference pilot strength is greater than the UPST. If so, in step 58, no redirection is called for by the Echo access screening method described herein and execution proceeds normally. Additionally, in step 58, the ORM Received flag is set. If a negative determination is made in step 56, in step 60, a determination is made whether an additional pilot is reported having a strength greater than that of the reference pilot. If so, execution proceeds to step 62, in which a determination is made whether the strength of the reference pilot exceeds the LPST.

If a positive determination is made in step 62, execution proceeds to step 64, in which no redirection is called for by the Echo access screening method described herein and execution proceeds normally. Additionally, in step 64, the ORM Received flag is set. If a negative determination is made in either of steps 60 or 62, execution proceeds to step 66, in which a determination is made whether the ORM flag is set to ensure that this is not a duplicate origination. If the ORM flag is set, execution proceeds to step 68, in which no redirection is called for by the Echo access screening method described herein and execution proceeds normally. If a negative determination is made in step 66, in step 70, a "Service Redirection Message" is sent multiple (e.g., three) times and the ORM is discarded. This step results in redirection of the mobile unit.

It will be recognized that the steps illustrated in FIG. 2 may be performed in a different order; for example, it may be preferable in some instances to determine first whether the specified reference pilot strength exceeds the LPST, with originations having specified reference pilot strengths that fall below the LPST being redirected. In summary, implementation of the Ec/Io access screening method and system produce the following results. Originations having a reference pilot strength above the UPST are not redirected. Originations having a reference pilot strength between the UPST and the LPST and with no additional pilot reported having a strength between the UPST and the LPST are redirected. Originations having a reference pilot strength between the UPST and LPST and including at least one additional pilot having a strength greater than that of the reference pilot are not redirected. Originations with a reference pilot below the LPST are always redirected.

As a result of the embodiments described herein, originations on weak pilots are given an opportunity to change to stronger pilots. Redirections where both the mobile terminal and network support CASHO and that feature is turned on are avoided if additional pilots stronger than the reference are present; therefore, unnecessary redirections are avoided. In addition, access failures and dropped calls due to weak pilots are reduced.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A base station for a wireless network, the base station comprising:

an RF interface operable to couple the base station to the wireless network to transmit RF signals to and receive RF signals from the wireless network, the received RF signals including origination messages;

at least one signal processor coupled to the RF interface and operable:

to compare a reference pilot strength specified in an origination message received from a mobile unit with an upper pilot strength threshold and a lower pilot strength threshold;

to redirect originations when the specified reference pilot strength is between the upper pilot strength threshold and the lower pilot strength threshold and no additional pilot is reported having a strength between the upper pilot strength threshold and the lower pilot strength threshold; and to redirect originations when the specified reference pilot strength is below the lower pilot strength threshold.

2. The base station of claim 1, wherein the at least one signal processor is further operable, when the reference pilot strength exceeds the upper pilot strength threshold:
to set an original message received flag; and
to forego redirection of the mobile unit.

3. The base station of claim 1, wherein the at least one signal processor is further operable:
to determine whether an origination message received flag is set; and
to forego redirecting the mobile unit when the origination received flag is set.

4. The base station of claim 1, wherein the at least one signal processor is operable to send a service redirection message to the mobile unit.

5. The base station of claim 4, wherein the at least one signal processor is operable to send the service redirection message to the mobile unit multiple times.

6. The base station of claim 4, wherein the at least one signal processor is operable to discard the origination message.

7. The base station of claim 4, wherein pilot strength is measured in decibels.

8. The base station of claim 4, wherein pilot strength is equal to Ec/Io, wherein Ec is pilot energy accumulated over one chip period and Io is total power spectral density in a received bandwidth.

9. The base station of claim 8, wherein the chip period is a pseudo-noise chip period.

10. The base station of claim 1, wherein the wireless network comprises a code division multiple access (CDMA) network.

11. A method of determining whether to redirect originations in a wireless network, comprising:
comparing a strength of a reference pilot specified in an origination message received from a mobile unit with an upper pilot strength threshold and a lower pilot strength threshold;
responsive to the strength of the reference pilot being between the upper pilot strength threshold and the lower pilot strength threshold and no additional pilot is reported having a strength between the upper pilot strength threshold and the lower pilot strength threshold, redirecting the mobile unit; and
responsive to the strength of the reference pilot being below the lower pilot strength threshold, redirecting the mobile unit.

12. The method of claim 11, further comprising:
when the strength of the reference pilot exceeds the upper pilot strength threshold:
setting an original message received flag; and
foregoing redirection of the mobile unit.

13. The method of claim 11, further comprising:
determining whether an origination message received flag is set; and
foregoing redirecting the mobile unit when the origination received flag is set.

14. The method of claim 11, further comprising sending a service redirection message to the mobile unit.

15. The method of claim 14, wherein said sending the service redirection message comprises sending the service redirection message to the mobile unit multiple times.

16. The method of claim 14, further comprising:
discarding the origination message.

17. The method of claim 14, wherein pilot strength is measured in decibels.

18. The method of claim 14, wherein pilot strength is equal to Ec/Io, wherein Ec is pilot energy accumulated over one chip period and Io is total power spectral density in a received bandwidth.

19. The method of claim 11, wherein the wireless network comprises a code division multiple access (CDMA) network.

20. A non-transitory, computer accessible memory medium storing program instructions for determining whether to redirect originations in a wireless network, wherein the program instructions are executable by a processor to:
compare a strength of a reference pilot specified in an origination message received from a mobile unit with an upper pilot strength threshold and a lower pilot strength threshold;
responsive to the strength of the reference pilot being between the upper pilot strength threshold and the lower pilot strength threshold and no additional pilot is reported having a strength between the upper pilot strength threshold and the lower pilot strength threshold, redirect the mobile unit; and
responsive to the strength of the reference pilot being below the lower pilot strength threshold, redirect the mobile unit.

* * * * *